(12) United States Patent
Needham

(10) Patent No.: US 6,837,423 B2
(45) Date of Patent: Jan. 4, 2005

(54) ASSOCIATING EVENT RECORDINGS WITH EVENT PARTICIPANTS

(75) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 10/003,147

(22) Filed: Nov. 14, 2001

(65) Prior Publication Data

US 2003/0089766 A1 May 15, 2003

(51) Int. Cl.⁷ .............................................. G06F 17/00
(52) U.S. Cl. ....................................... 235/375; 725/86
(58) Field of Search ............................. 235/375; 705/5, 705/6, 13, 41; 340/500, 540, 545.2, 572.1; 725/86; 463/8

(56) References Cited

U.S. PATENT DOCUMENTS

| | | | | |
|---|---|---|---|---|
| 5,512,396 A | * | 4/1996 | Hicks | ............................ 430/21 |
| 5,696,488 A | * | 12/1997 | Assisi | .................... 340/539.11 |
| 5,960,572 A | * | 10/1999 | DeVito | .......................... 40/593 |
| 2002/0199198 A1 | * | 12/2002 | Stonedahl | ..................... 725/86 |

OTHER PUBLICATIONS

60/299,630.*

* cited by examiner

Primary Examiner—Thien M. Le
Assistant Examiner—Lisa M. Caputo
(74) Attorney, Agent, or Firm—Steven D. Yates

(57) ABSTRACT

Disclosed embodiments facilitate correlation between recordings of an event, e.g., photographs, videos, audio recordings, holographic recordings, etc., and one interested in obtaining a copy of the recordings, e.g., participants, watchers/audience, managers, other recorders, etc. As recordings from a particular location in the event are made, a signal is emitted by the recorder that may be received by recipients, such as people or locations, e.g., desired vantage points, seats, etc. The emitted signal includes an identifier that allows a recipient to identify the recording. Use of the emitted signal may be limited to people or locations near the recorder. A broker service may facilitate anonymous or face-to-face commercial sales or other distribution of recordings between recorders and recipients.

43 Claims, 5 Drawing Sheets

ASSOCIATING EVENT RECORDINGS WITH EVENT PARTICIPANTS

FIELD OF THE INVENTION

The invention generally relates to recording an event, and more particularly to facilitating obtaining copies of a recording based at least in part on positioning data, such as global positioning data (GPS), associated with a recorder.

BACKGROUND

During public events, such as a sports competition, presentation, or the like, persons at the event typically record some or all of the event, such as with a video recorder, camera, audio recorder, or the like. Frequently there are professional recorders in addition to amateur recorders that may also be present at the event. For example, at a sporting event, there are frequently freelance photographers at the side-lines recording the event and parties attending the event (e.g., crowd shots or the like).

A person at the event, or participating in the event, may find it desirable to purchase a copy of a professional's recording of the event. For example, the person may be part of the event, or may have forgotten to bring a recorder, e.g., a camera, or the person's recording equipment may be low quality. Or, the person may be interested in obtaining pictures of her or himself at the event, an option not typically available unless a companion uses the person's recorder to take a picture.

One existing solution allowing a person in a photograph to locate photographs likely including the person is provided by ImageID Ltd. Of New York, N.Y., which provides technology in which one wears an identification badge that is recorded along with the recording of an event. (See www-vividot-com; please note that to prevent inadvertent hyperlinks, the periods in the preceding uniform resource locator (URL) were replaced with hyphens.) For example, if a picture is taken of a person, the person's badge is pictured, and a computer system can scan the picture to identify all badges that are in the picture.

A significant limitation to this arrangement, however, is that a person's identification badge must be adequately captured in a recording to enable the person to later search for pictures containing the person. Thus, a crowd shot would have insufficient detail to allow later identifying the person's identification badge. Another significant limitation is that the person cannot obtain recordings in which the person does not appear. For example, the person cannot locate a professional recording taken from a position adjacent the person, or directed away from the person.

BRIEF DESCRIPTION OF THE DRAWINGS

The features and advantages of the present invention will become apparent from the following detailed description of the present invention in which.

DETAILED DESCRIPTION

Figure 1:
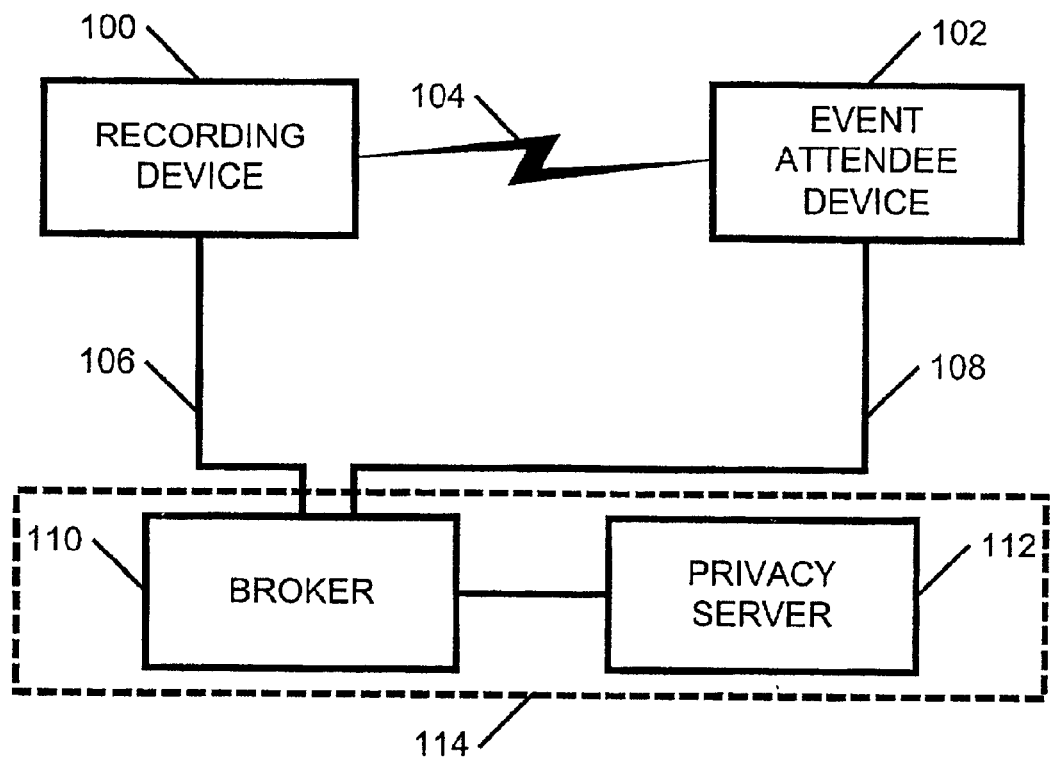
FIG. 1 illustrates a system according to one embodiment of the invention in which an event attendee is facilitated in obtaining a recording of the event.

FIG. 1 illustrates a system according to one embodiment of the invention in which a person at an event is facilitated in obtaining recordings of the event that are of interest to the person.

As illustrated, a recording device 100, which may be a video recorder, camera, audio recorder, three-dimensional imaging apparatus, or other recording technology, is used to record an event. An event attendee device 102 (e.g., a device associated with an event attendee, such as a badge, key-card, ticket, machine, computing device, etc.) is communicatively coupled with the recording device over a wireless link 104, such as a short-range radio technology such as "Bluetooth" link (see www-bluetooth-com), an 802.11 link (a communication technology promulgated by the Institute of Electrical and Electronics Engineers (IEEE) for wireless LAN technology), an infrared (IR) link, or some other communication technique. In another embodiment, not illustrated, the event attendee device is physically coupled to the recorder, possibly only intermittently, by way of direct contact, a cable, or other coupling.

The recorder 100 and event attendee device 102 are both intermittently or continuously communicatively coupled 106, 108, e.g., physically or wirelessly, to a broker 110. The broker represents a conduit through which recordings from the recorder may be provided, e.g., given, sold, etc., to event attendees. The following figures illustrate several exemplary embodiments in which a broker is used to distribute event recordings. It will be appreciated that many different communication models, including ones not illustrated, may be employed to distribute recordings to event attendees.

In some circumstances, it may be desirable that the distribution of a recording be made anonymously. For example, a person operating the recorder might wish to remain unknown, or an attendee might not wish to become known. In such circumstances, communication between persons associated with the recorder and event attendee device may be routed through a privacy server 112 configured to effect a transaction between the parties without revealing their identities. Note that even though the broker is illustrate as being communicatively coupled to a separate privacy server, it will be appreciated that the broker and privacy server may be a single physical or logical machine 114.

Figure 2:
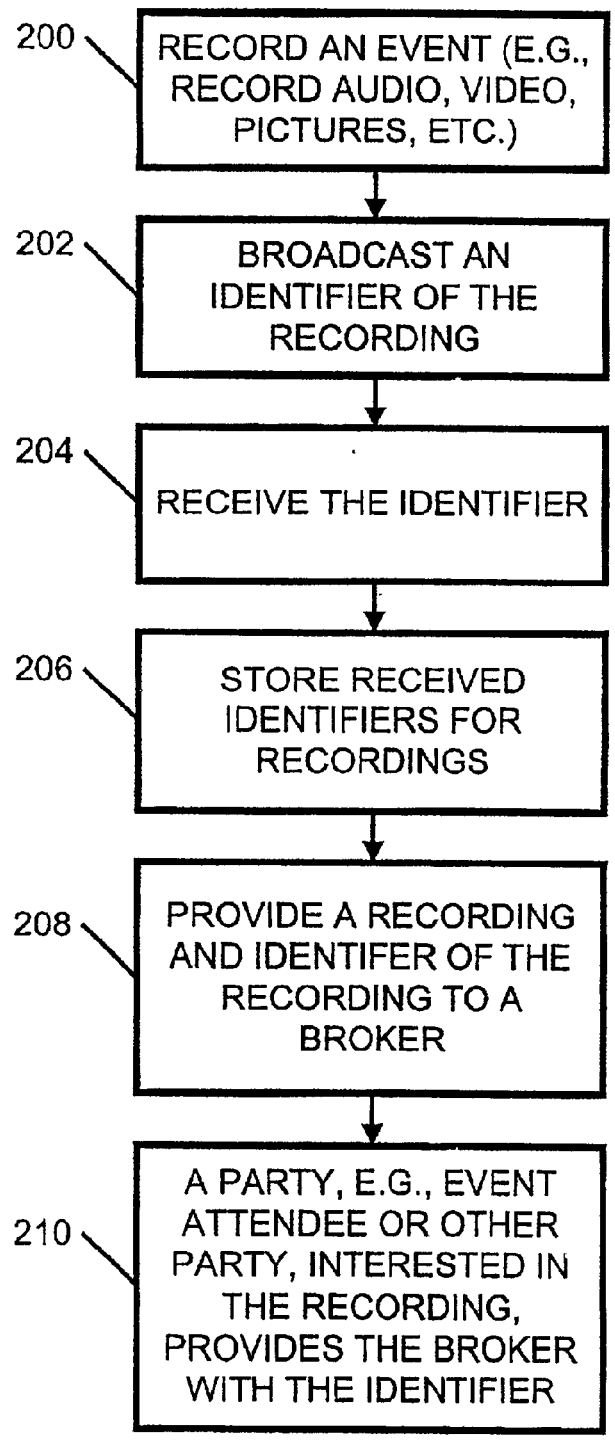
FIG. 2 illustrates one exemplary embodiment in which a recorder records an event, and an event attendee obtains a copy of the recording.

FIG. 2 illustrates one exemplary embodiment in which a recorder records 200 an event, and an event attendee obtains a copy of the recording. While recording, the recorder broadcasts 202 an identifier, e.g., a globally unique identifier (GUID), hash value, or other (near) unique value that identifies the recording. For example, for a camera, the identifier is associated with a current picture being taken. In one embodiment, environmental characteristics regarding the recording are also embedded within or associated with the identifier, such as lighting conditions, physical location of the recording, etc.

The broadcast identifier is received 204, such as by a badge worn by an event attendee, or other event attendee device or structure associated with the attendee, e.g., a seat or seat component. The received identifier is stored 206 for later use to retrieve the recording. To do so, an operator of the recorder provides 208 the recording and broadcasted 202 recording identifier to a broker. It is assumed that associated with the provision are distribution terms, such as price, duration of availability, etc. A party, such as an event attendee, interested in obtaining a copy of the recording according to the distribution terms provides 210 the broker with the broadcasted recording identifier, which in turn provides the recording according to the distribution terms.

In such fashion, assuming that the broadcast 202 of the identifier is based on a relatively-short range technology (or a long-range technology in which positional data may be acquired to allow identifying short-ranges), an event attendee may identify and obtain recordings that do not include the event attendee in the recording. In addition, such providing of recordings may be performed with no more effort by the recorder than making such recording available to the broker. In the illustrated embodiment, the interested party is required to track broadcasted recording identifiers.

Figure 3:
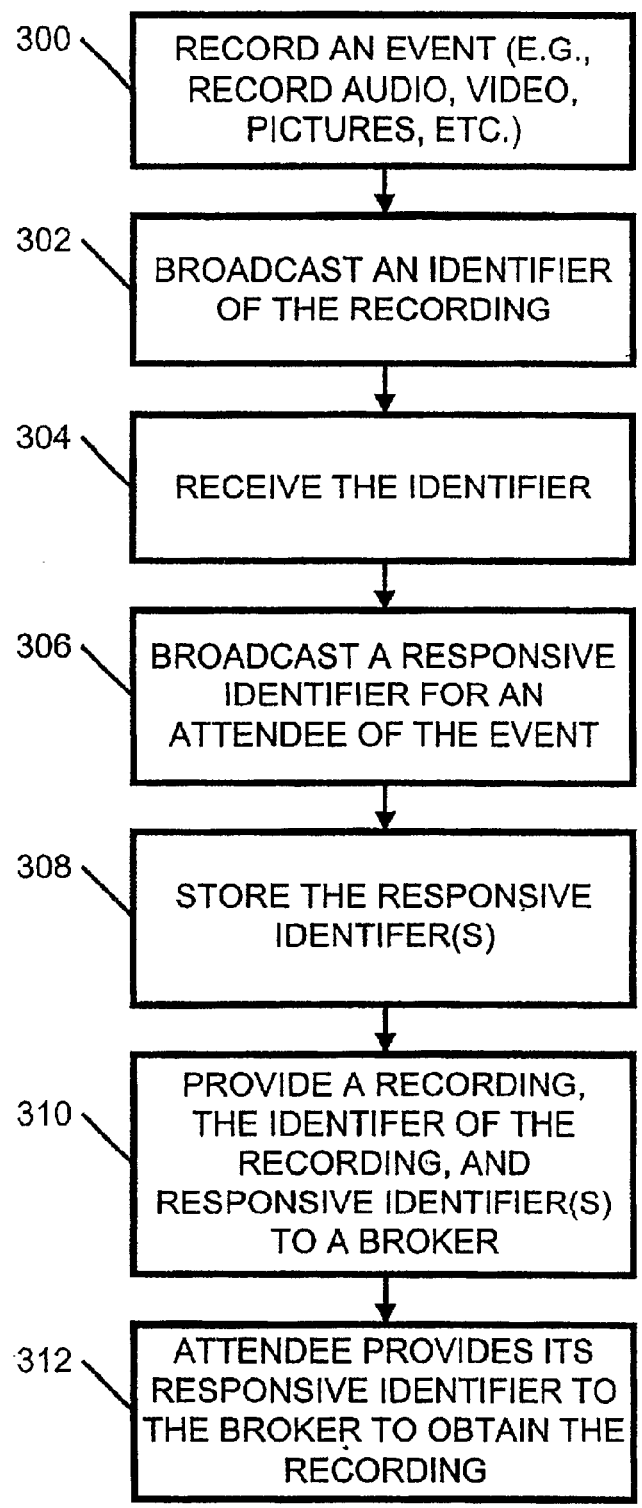
FIG. 3 illustrates another exemplary embodiment in which a recorder records an event, and an event attendee obtains a copy of the recording.

FIG. 3 illustrates another exemplary embodiment in which, as discussed above in FIG. 2, a recorder records 300 an event, broadcasts 302 a unique or near unique (e.g., hash based, etc.) identifier for the recording, and the identifier is received 304 by an event attendee device. However, in contrast with FIG. 2, in this embodiment, the receiving event attendee device broadcasts 306 a responsive identifier identifying the event attendee device. Note that an event attendee may anonymously utilize the event attendee device.

The recorder (or device associated thereto) receives and stores 308 such responsive identifiers. In such manner, the recorder is able to track attendees that express an interest in obtaining the recording. It will be appreciated that various techniques may be employed by a receiving event attendee device to control for which recordings the device broadcasts 306 responsive identifiers. For the purposes of this description, it is assumed that all recordings are provided with a responsive identifier, however, it will be appreciated that an event attendee may restrict responses to certain recordings, such as those by a certain recording person (if known), from a certain vantage point within the event, for certain occurrences within the game, etc.

An operator of the recorder provides 310 the recording, broadcasted 302 recording identifier, and stored responsive identifiers to a broker. A party interested in obtaining a copy of the recording can provide 312 the broadcasted 306 responsive identifier to the broker to obtain the recording. However, in this embodiment, and unlike FIG. 2, restrictions can be placed on who can obtain the recording. In particular, since the recorder knows what responses were broadcast 306 back to the recorder, the operator of the recorder can restrict access to the recording to only those parties that responded to the recording. Alternatively, the operator of the recorder may set different terms, such as a higher price, to those parties that can provide the broadcasted 302 identifier of the recording, but are not known to have broadcast 306 a responsive identifier.

Figure 4:
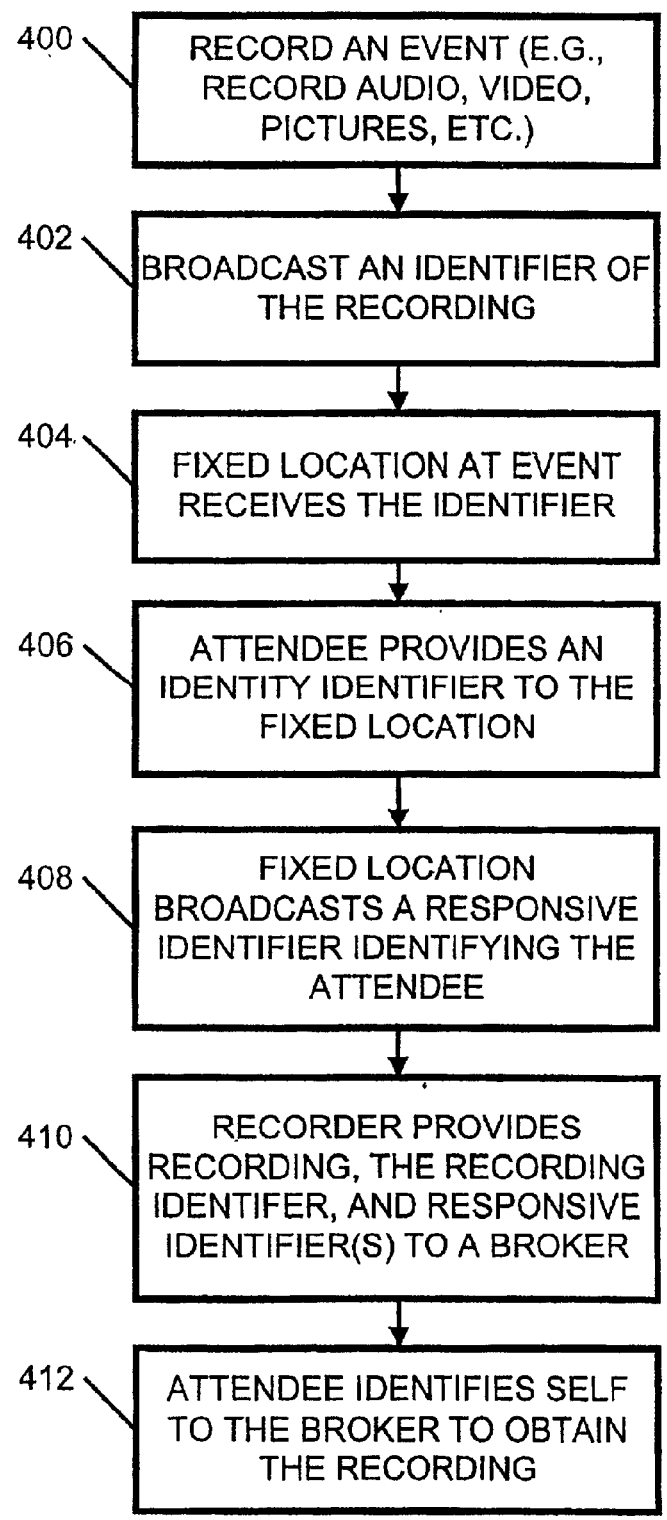
FIG. 4 illustrates another exemplary embodiment in which a recorder records an event, and an event attendee obtains a copy of the recording.

FIG. 4 illustrates another exemplary embodiment in which, as discussed above, a recorder records 400 and event and broadcasts 402 an identifier for the recording. However, in this embodiment, a fixed location at the event, such as a chair on which an event attendee sits, or another structure at desirable vantage points, e.g., behind home plate at baseball game, courtside at a basketball game, in the water in an aquatic competition, etc., receives 404 the broadcasted 402 identifier.

A badge or other article or device associated with the attendee provides 406 an identifier for the attendee to the fixed location. It will be appreciated that even though the figure illustrates providing 406 after receiving 404 the broadcasted 402 identifier, such providing may occur as desired before during or after the recording 400 of the event. It will be further appreciated that the attendee is not restricted to providing 406 an identifier to fixed locations proximate to the attendee.

In one embodiment, not illustrated, an attendee may take a badge or other article or device associated with the attendee to fixed locations at the event and register interest in receiving recordings that occur near that fixed location. This would allow, therefore, recorders to wander about and event and record the event as desired, and attendees would be able to obtain copies of recordings that happened to occur near the fixed location. It will be appreciated that the concept of "near" may be defined as desired, and may be limited by transmission ranges inherent to the technology used to broadcast identifiers, or may be limited, if desired, based on positioning calculations.

In the illustrated embodiment, somewhat akin to FIG. 3 item 306, the fixed location broadcasts 408 a responsive identifier, based at least in part on the provided 406 attendee identifier, is broadcasted to the recorder that identifies the attendee. An operator of the recorder in turn provides 410 the recording, the identifier for the recording, and received responsive identifiers to a broker. This allows an attendee to later identify 412 itself to the broker and obtain a copy of the recording from the broker. As discussed above, such obtaining may be performed anonymously.

In another embodiment, not illustrated, the operations of providing 406 and broadcasting 408 the attendee's identity is not performed, and in turn, the recorder does not provide 410 it to the broker. Instead, as discussed above, fixed locations track recordings 400 that occurred near them, and a party interested in a recording simply contacts the broker to obtain copies of recording that may have occurred from desired fixed locations. In addition, note that in other embodiments, fixed need not be fixed, e.g., the recorder can track it's location at the event, and one may seek recordings that happened to occur at or near a desired vantage point.

Figure 5:
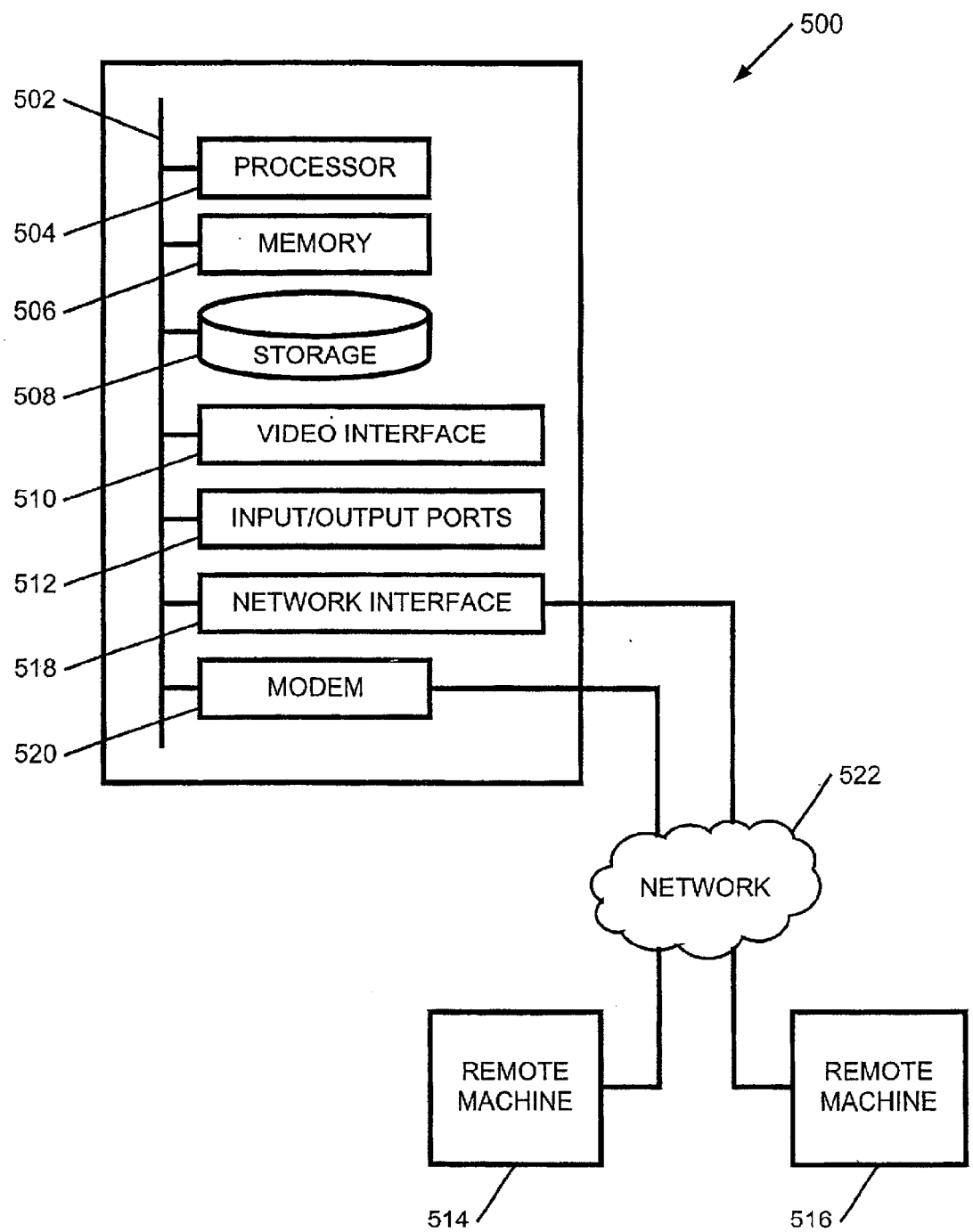
FIG. 5 illustrates a suitable computing environment in which certain aspects of the invention may be implemented.

FIG. 5 and the following discussion are intended to provide a brief, general description of a suitable computing environment in which certain aspects of the illustrated invention may be implemented. An exemplary system for embodying, for example, the broker 110, privacy server 112, or recording device 100 of FIG. 1, includes a machine 500 having system bus 502. As used herein, the term "machine" includes a single machine, such as a computer or other machine, or a system of machines or other communicatively coupled devices operating together.

Typically, attached to the bus are processors 504, a memory 506 (e.g., RAM, ROM), storage devices 508, a video interface 510, and input/output interface ports 512. The machine 500 may be controlled, at least in part, by input from conventional input devices, such as keyboards, mice, joysticks, as well as directives received from another machine, a user's interaction with a virtual reality (VR) environment, biometric feedback, e.g., data incident to monitoring a person, plant, animal, organism, etc., or other input.

The system may also include embedded controllers, such as Generic or Programmable Logic Devices or Arrays, Application Specific Integrated Circuits, single-chip computers, smart cards, or the like, and the system is expected to operate in a networked environment using physical and/or logical connections to one or more remote machines 514, 516 through a network interface 518, modem 520, or other data pathway. Machines may be interconnected by way of a wired or wireless network 522, such as the wireless link 104 of FIG. 1, an intranet, the Internet, local area networks, wide area networks, cellular, cable, laser, satellite, microwave, "Bluetooth" type networks, optical, infrared, or other short range or long range wired or wireless carrier.

The invention may be described by reference to or in conjunction with program modules, including functions, procedures, data structures, application programs, etc. for performing tasks, or defining abstract data types or low-level hardware contexts. Program modules may be stored in memory 506 and/or storage devices 508 and associated storage media, e.g., hard-drives, floppy-disks, optical storage, magnetic cassettes, tapes, flash memory cards, memory sticks, digital video disks, biological storage. Program modules may be delivered over transmission environments, including network 522, in the form of packets, serial data, parallel data, propagated signals, etc. Program modules may be used in a compressed or encrypted format, and may be used in a distributed environment and stored in local and/or remote memory, for access by single and multi-processor machines, portable computers, hand-held devices, e.g., Personal Digital Assistants (PDAs), cellular telephones, etc.

Thus, for example, with respect to the illustrated embodiments, assuming machine 500 operates as a recorder 100 (FIG. 1), then remote machines 514, 516 may respectively be a broker 110, and a privacy server 112. It will be appreciated that remote machines 514, 516 may be configured like machine 500, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method comprising:
   receiving, by an article associated with an attendee of an event, an identifier broadcasted by a recording device making a recording of the event, the identifier identifying at least the recording of the event;
   storing the identifier in a memory communicatively coupled to the article;
   determining a proximity relationship between the article and the recording device; and
   determining whether to store the identifier in the memory communicatively coupled to the article based at least on the determined proximity relationship.

2. The method of claim 1, further comprising:
   emitting a responsive signal by the article to acknowledge receiving the identifier broadcasted by the recording device.

3. The method of claim 1, wherein the article associated with the attendee of the event is a badge worn by the attendee.

4. The method of claim 1, wherein the article associated with the attendee of the event is a ticket issued to the attendee.

5. The method of claim 1, further comprising:
   providing the recording and identifier of the recording to a distributor which distributes the recording to entities providing to the distributor the identifier.

6. The method of claim 5, further comprising:
   providing the distributor with distribution terms for the recording, wherein the distributor distributes the recording according to the distribution terms.

7. A method comprising:
   receiving, by an article associated with an attendee of an event, an identifier broadcasted by a recording device making a recording of the event, the identifier identifying at least the recording of the event;
   storing the identifier in a memory communicatively coupled to the article;
   determining a vantage point of the recording device; and
   determining whether to store the identifier in the memory communicatively coupled to the article based at least on the determined vantage point.

8. The method of claim 7, wherein the identifier is broadcasted with a short-range emitter so that only articles near the recording device receive the identifier.

9. A method comprising:
   receiving, by an article associated with an attendee of an event, an identifier broadcasted by a recording device making a recording of the event, the identifier identifying at least the recording of the event;
   storing the identifier in a memory communicatively coupled to the article; and
   providing the recording and identifier of the recording to a distributor which distributes the recording to entities providing to the distributor the identifier;
   wherein an identity for at least one party to a distribution of the recording remains anonymous.

10. A method comprising:
    recording an event with a recorder that broadcasts at least one identifier identifying the recorder;
    receiving a responsive identifier from an entity interested in the recording;
    associating the responsive signal with the recording;
    receiving a request to purchase the recording, the request comprising the responsive signal;
    identifying the recording based at least in part on the responsive signal; and
    providing the recording to a broker configured to anonymously sell the recording.

11. The method of claim 10, wherein the signal is a short-range signal so that responsive signals are received only from entities near to the recording of the event.

12. The method of claim 10, further comprising:
    offering the recording for distribution to interested parties;
    determining standard distribution terms; and
    offering favorable distribution terms to a first party associated with the entity from which the responsive signal was received.

13. A method comprising:
    recording an event with a recorder that broadcasts at least one identifier identifying the recorder;

receiving a responsive identifier from an entity interested in the recording; and associating the responsive signal with the recording;

wherein the identification signal comprises a first location component indicating where the recording occurred.

14. The method of claim 13, wherein the responsive signal comprises a second location component indicating where the entity was located, the method further comprising:

offering the recording for distribution to interested parties based at least in part on the first and the second locations.

15. The method of claim 14, further comprising:

determining a proximity based at least in part on the first and the second distances.

16. The method of claim 15, further comprising:

only associating the responsive signal with the recording if the proximity meets a desired maximal proximity.

17. The method of claim 13, further comprising:

receiving a request from an interested party to purchase the recording, the request comprising the responsive signal; and providing the recording to the interested party in both an electronic format and a hard-copy format as well.

18. A method comprising:

recording an event with a recorder that broadcasts at least one identifier identifying the recorder;

receiving a responsive identifier from an entity interested in the recording; and associating the responsive signal with the recording;

receiving a request from an interested party to purchase the recording, the request comprising the responsive signal;

providing the recording to the interested party in both an electronic format and a hard-copy format as well, wherein providing the recording occurs through an anonymizing broker.

19. A system comprising:

a recorder for recording an event, the recorder configured to emit at least one identification signal that identifies the recording;

a badge responsive to the emitted identification signal and configured to emit a responsive signal identifying the badge to the recorder;

a distributor for managing distribution of the recording to a party associated with the badge; and a vantage point communicatively coupled with the distributor and the badge;

wherein the vantage point is configured to provide both the identification signal and the responsive signal to the distributor.

20. The system of claim 19, further comprising:

a storage for storing, at least temporarily, a cross-reference between the identification signal and the responsive signal;

wherein the distributor is configured to receive a distribution request from the party, determine the cross-reference, and provide the recording to the party.

21. The system of claim 19, wherein the recorder is configured to associate the responsive signal with the recording and provide said association to the distributor.

22. An article comprising a machine-accessible media having associated data, wherein the data, when accessed, results in a machine performing:

recording an event with a recorder that broadcasts at least one identifier identifying the recorder;

receiving a responsive identifier from an entity interested in the recording;

associating the responsive signal with the recording;

receiving a request to purchase the recording, the request comprising the responsive signal;

identifying the recording based at least in part on the responsive signal; and providing the recording to a broker configured to anonymously sell the recording.

23. The article of claim 22, wherein the signal is a short-range signal so that responsive signals are received only from entities near to the recording of the event.

24. The article of claim 22 wherein the machine-accessible media further includes data, when accessed by the machine, results in the machine performing:

offering the recording for distribution to interested parties;

determining standard distribution terms; and offering favorable distribution terms to a first party associated with the entity from which the responsive signal was received.

25. An article comprising a machine-accessible media having associated data, wherein the data, when accessed, results in a machine performing:

recording an event with a recorder that broadcasts at least one identifier identifying the recorder;

receiving a responsive identifier from an entity interested in the recording; and associating the responsive signal with the recording;

wherein the identification signal comprises a first location component indicating where the recording occurred.

26. The article of claim 25, wherein the responsive signal comprises a second location component indicating where the entity was located, and wherein the machine-accessible media further includes data, when accessed by the machine, results in the machine performing:

offering the recording for distribution to interested parties based at least in part on the first and the second locations.

27. The article of claim 26 wherein the machine-accessible media further includes data, when accessed by the machine, results in the machine performing: determining a proximity based at least in part on the first and the second distances.

28. The article of claim 27 wherein the machine-accessible media further includes data, when accessed by the machine, results in the machine performing: only associating the responsive signal with the recording if the proximity meets a desired maximal proximity.

29. The article of claim 25 wherein the machine-accessible media further includes data, when accessed by the machine, results in the machine performing:

receiving a request from an interested party to purchase the recording, the request comprising the responsive signal; and providing the recording to the interested party in both an electronic format and a hard-copy format as well.

30. An article, comprising a machine-accessible media having associated data, wherein the data, when accessed, results in a machine performing:

recording an event with a recorder that broadcasts at least one identifier identifying the recorder;

receiving a responsive identifier from an entity interested in the recording; and associating the responsive signal with the recording;

receiving a request from an interested party to purchase the recording, the request comprising the responsive signal; and providing the recording to the interested party in both an electronic format and a hard-copy format as well;

wherein providing the recording occurs through an anonymizing broker.

31. A system comprising:

recording means for recording an event, the recorder configured to emit at least one identification signal that identifies the recording, wherein the identification signal comprises a first location component indicating where the recording occurred;

badge means responsive to the emitted identification signal and configured to emit a responsive signal identifying at least proximity of the badge to the recorder; and distribution means for managing distribution of the recording to a party associated with the badge.

32. The system of claim 31, further comprising:

coupling means communicatively coupled with the distribution means and the emitting means, and configured to provide both the identification signal and the responsive signal to the distributor.

33. The system of 31, further comprising:

a storage for storing, at least temporarily, a cross-reference between the identification signal and the responsive signal;

wherein distribution means is configured to receive a distribution request from the party, determine the cross-reference, and provide the recording to the party.

34. The system of claim 31, wherein the recording means is configured to associate the responsive signal with the recording and provide said association to the distributor.

35. An article comprising, a machine-accessible media having associated data, wherein the data, when accessed, results in a machine performing:

receiving by an article associated with an attendee of an event an identifier broadcasted by a recording device making a recording of the event, the identifier identifying at least the recording of the event;

storing the identifier in a memory communicatively coupled to the article;

determining a proximity relationship between the article and the recording device; and determining whether to store the identifier in the memory communicatively coupled to the article based at least on the determined proximity relationship.

36. An article comprising, a machine-accessible media having associated data, wherein the data, when accessed, results in a machine performing:

receiving by an article associated with an attendee of an event an identifier broadcasted by a recording device making a recording of the event, the identifier identifying at least the recording of the event;

storing the identifier in a memory communicatively coupled to the article;

determining a vantage point of the recording device; and determining whether to store the identifier in the memory communicatively coupled to the article based at least on the determined vantage point.

37. The article of claim 36, wherein the identifier is broadcasted with a short-range emitter so that only articles near the recording device receive the identifier.

38. The article of claim 36 wherein the machine-accessible media further includes data, which when accessed by the machine, results in the machine performing:

providing the recording and identifier of the recording to a distributor which distributes the recording to entities providing to the distributor the identifier.

39. The article of claim 38 wherein the machine-accessible media further includes data, which when accessed by the machine, results in the machine performing:

providing the distributor with distribution terms for the recording, wherein the distributor distributes the recording according to the distribution terms.

40. An article comprising, a machine-accessible media having associated data, wherein the data, when accessed, results in a machine performing:

receiving by an article associated with an attendee of an event an identifier broadcasted by a recording device making a recording of the event, the identifier identifying at least the recording of the event; and storing the identifier in a memory communicatively coupled to the article;

providing the recording and identifier of the recording to a distributor which distributes the recording to entities providing to the distributor the identifier.

wherein an identity for at least one party to a distribution of the recording remains anonymous.

41. The article of claim 40 wherein the machine-accessible media further includes data, which when accessed by the machine, results in the machine performing:

emitting a responsive signal by the article to acknowledge receiving the identifier broadcasted by the recording device.

42. The article of claim 40, wherein the article associated with the attendee of the event is a badge worn by the attendee.

43. The article of claim 40, wherein the article associated with the attendee of the event is a ticket issued to the attendee.

* * * * *